J. H. APJOHN, DEC'D.
M. A. APJOHN, EXECUTRIX.
CLUTCH AND VARIABLE SPEED GEAR.
APPLICATION FILED MAY 1, 1915.

1,261,094.

Patented Apr. 2, 1918.
4 SHEETS—SHEET 2.

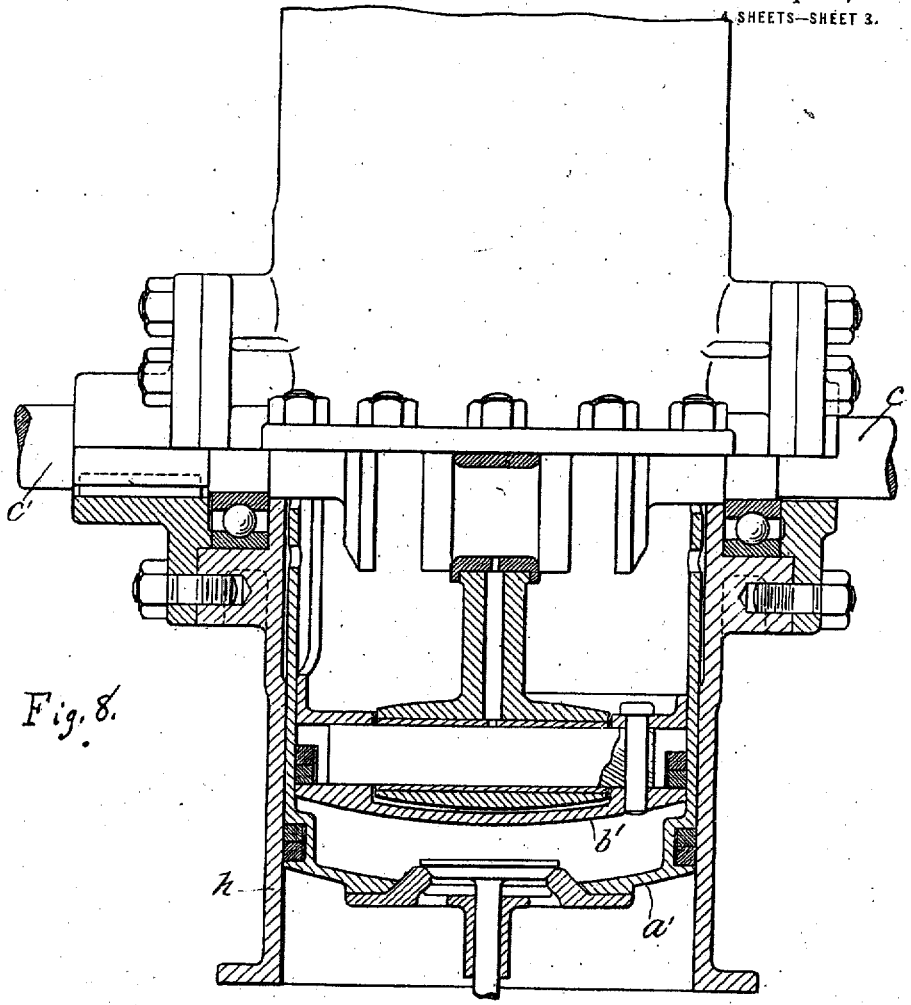

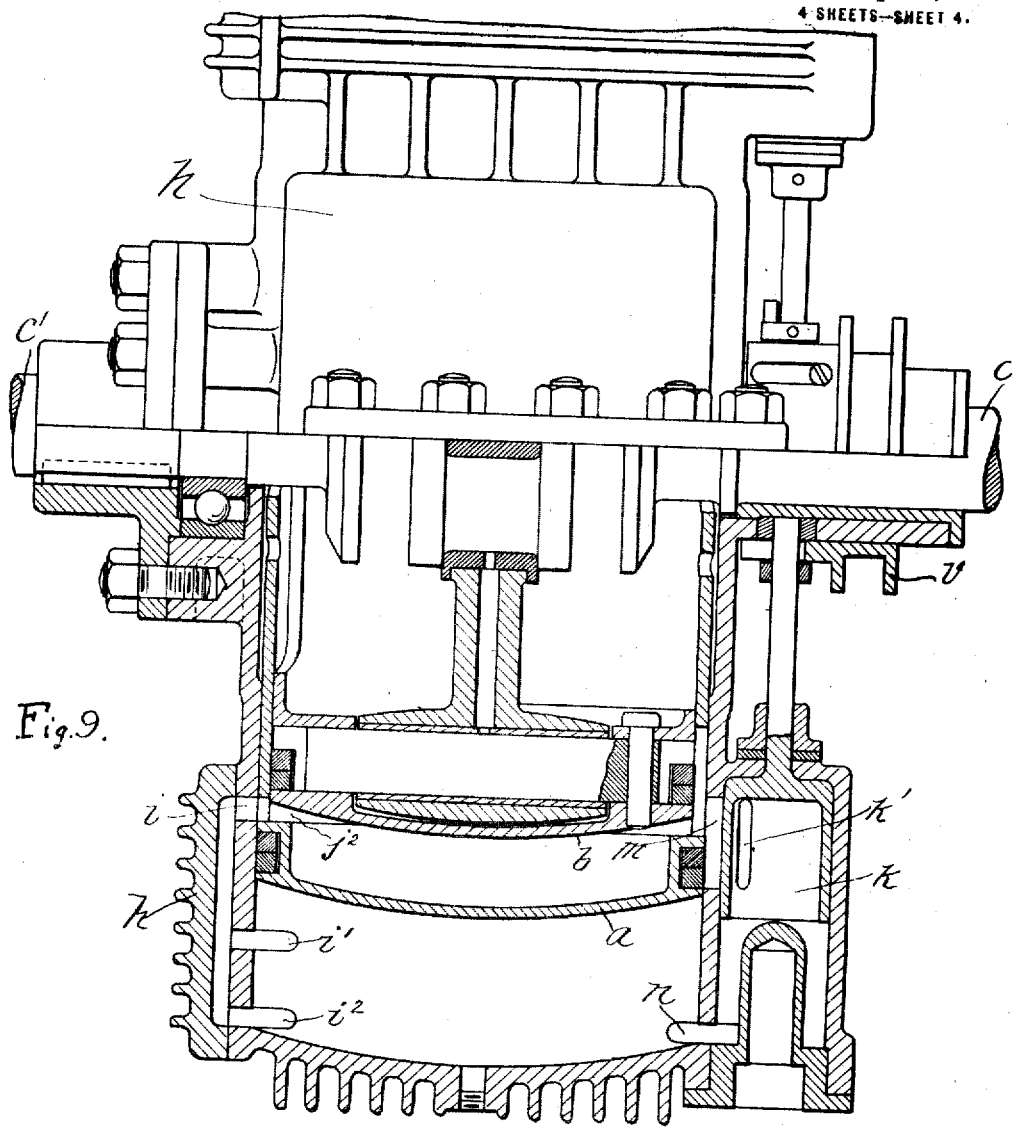

UNITED STATES PATENT OFFICE.

JAMES H. APJOHN, DECEASED, BY MARTHA AMANDA APJOHN, SOLE EXECUTRIX, OF LONDON, ENGLAND.

CLUTCH AND VARIABLE-SPEED GEAR.

1,261,094.   Specification of Letters Patent.   Patented Apr. 2, 1918.

Application filed May 1, 1915. Serial No. 25,285.

*To all whom it may concern:*

Be it known that MARTHA AMANDA APJOHN, a subject of the King of Great Britain and Ireland, residing at 52 Upper Mall, Hammersmith, London, W., England, is the sole executrix of the estate of JAMES H. APJOHN, deceased, and that the said JAMES H. APJOHN did invent certain new and useful Improvements in Clutch and Variable-Speed Gear, of which the following is a full, clear, and exact description of the same.

This invention relates to clutch and variable speed gear in which the driving member of the clutch or gear is so connected with the driven member that where a reduction in speed with increased torque is required the power is applied by the driving member to the driven member intermittently or by impulses which are imparted at varying intervals according to the speed of the driven member.

The object of the present invention is to provide a simple compact practical and efficient apparatus of the type referred to applicable for use as a clutch, as a clutch and variable speed gear for motor driven vehicles, or for use in either or both capacities for other purposes.

In a known type of clutch on which the present invention is an improvement, it has been proposed to employ as clutch members a cylinder or cylinders and a piston or pistons working therein and operating upon an elastic cushioning medium, such as air, one clutch member for example the piston or pistons being connected to a crank or cranks on the driving shaft or its equivalent, and the other clutch member for example the cylinder or cylinders being connected to the driven shaft or its equivalent.

Hitherto in this type of clutch a reduction of speed was invariably accompanied by a loss of power such reduction being brought about by opening a cock to relieve the compression in the cylinder or cylinders and thus allowing of a certain amount of slip.

Now according to this invention there is employed a cylinder and piston form of clutch as aforesaid, but the cylinders are so constructed that by making them sufficiently long or otherwise there is provided a free compression space therein such as will enable the pistons under abnormal loads to make a full stroke without release of the compression.

The resistance of the elastic cushioning medium is so calculated that for normal loads it is sufficient to prevent the piston or pistons from making a full stroke in the cylinder or cylinders with the result that by rotating the driving shaft the clutch members revolve as a whole. When however, the load is above the normal the resistance of the cushioning medium is not sufficient to prevent the piston or pistons from making a full stroke in the cylinder or cylinders so that while the driving shaft is able to revolve at the speed imparted by the engine and fly wheel the driven shaft lags behind, torque being applied to the driven shaft only during the compression of the elastic medium in the cylinders or until the cranks revolve past their dead centers and the pistons commence their return strokes during which the engine runs free and accelerates until the beginning of the next compression stroke of the pistons. Thus the speed of the driven shaft is reduced and the power of the driving shaft is conveyed thereto intermittently in the form of an impulse which takes effect during each compression stroke. It will be seen that the power absorbed in compressing the elastic cushioning medium during the working stroke of the piston will be restored practically without loss on the return stroke by the expansion effort of the cushioning medium.

In a modification, means are provided for relieving the pressure of the elastic cushioning medium before the piston reaches the end of its compression stroke and in some cases transferring it to act on another piston which is commencing its return stroke.

Means are also provided for relieving the piston or pistons entirely from the action of the elastic cushioning medium to put the clutch out of action.

In the preferred form of this invention the cylinder and piston combination are connected with the driving shaft and inclosed in a casing or guide which surrounds or incloses the cylinder or cylinders said casing being connected to the driven shaft and forming the driven part of the clutch.

In a practical form of the invention a pair of opposed radial cylinders are mounted to revolve freely on the driving shaft, and pistons which work in the cylinders are connected with cranks formed on the driving shaft at an angle of 180°. Each piston is firmly attached to the cylinder opposite to the one in which it works so that both piston and cylinder are reciprocated by the cranks, and an outer casing or guide is provided which surrounds the cylinders and is connected with the driven shaft, said casing thus forming the driven member of the clutch as hereinbefore described.

The invention is hereinafter described with reference to the accompanying drawings in which, Figure 1 is a vertical section of a clutch constructed according to this invention, Figs. 2, 3 and 4 are elevation, longitudinal section and transverse section respectively of one of the clutch cylinders, and Figs. 5 to 7 are similar views to Figs. 2, 3 and 4 illustrating one of the clutch pistons.

Fig. 8 is a longitudinal sectional axial view of the form shown in Fig. 1, drawn on a somewhat larger scale.

Fig. 9 is a view similar to Fig. 8, but illustrating a somewhat modified form of construction.

Figure 1:
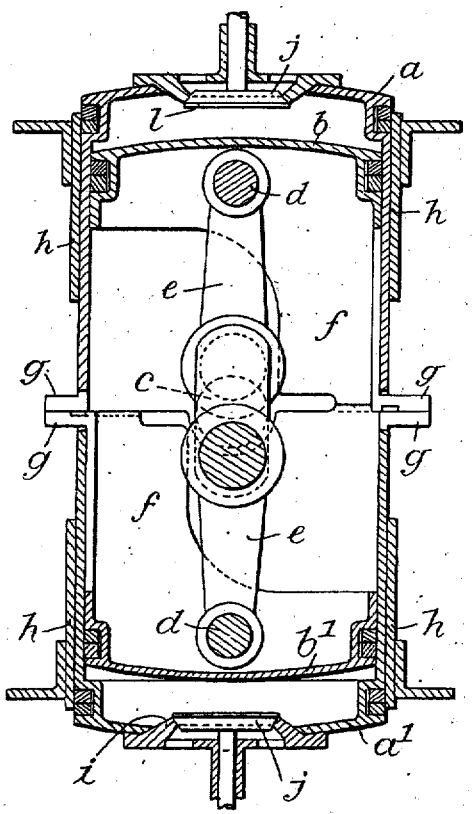
Figure 2:
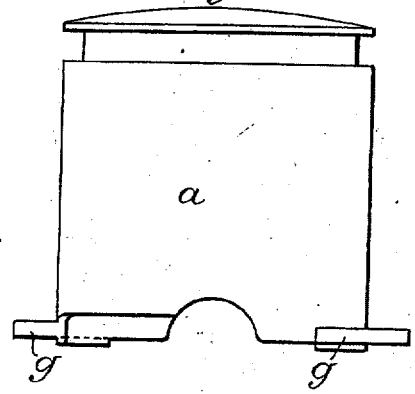
Figure 3:
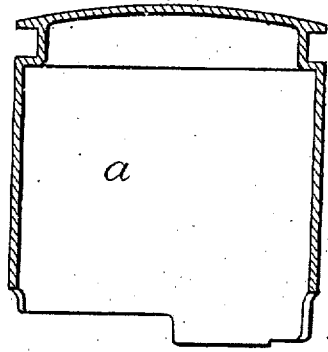
Figure 7:
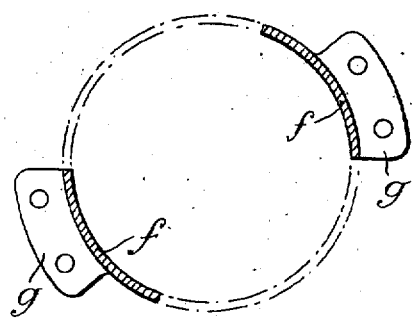
Figure 4:
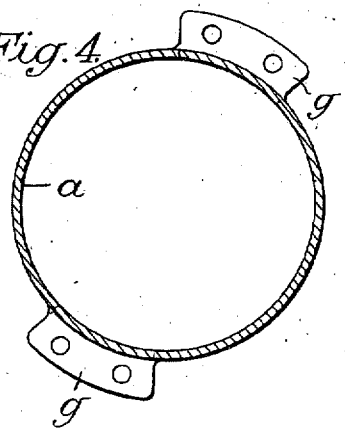
Figure 5:
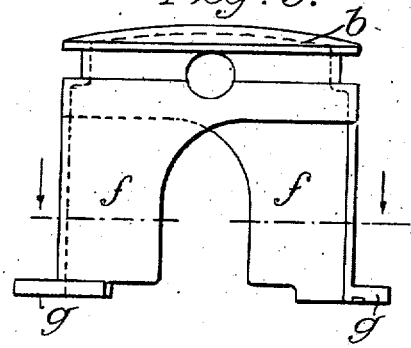
Figure 6:
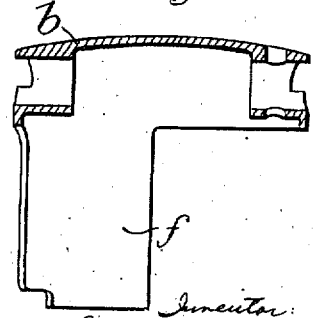

In the form of the invention shown in Figs. 1 to 8 the driving part of the clutch consists of two opposed radial cylinders $a$ $a^1$ arranged to slide in a guide or casing $h$ mounted to revolve freely on bearings similar to the ball bearings $h^1$ on the driving shaft $c$, and two opposite pistons $b$ $b^1$ working in the cylinders $a$ $a^1$ and connected by gudgeon pins $d$ and connecting rods $e$ to cranks formed on the driving shaft at an angle of 180°. The pistons $b$ $b^1$ are formed with segmental extensions or trunks $f$ which extend in opposite directions across the driving shaft and are connected to the opposite cylinders by flanges $g$ bolted to corresponding flanges on the cylinders, the arrangement being such that the cylinders $a$ $a^1$ are actuated to an equal extent and in the opposite direction to their respective pistons $b$ $b^1$ thus producing rapid compression of the elastic cushioning medium in the cylinders and reducing the length of the stroke. The casing or guide $h$ surrounding the cylinders forms the driven part and is operatively connected with the driven shaft $c^1$.

The outer ends of the cylinders $a$ $a^1$ are closed and each is provided with a seating $l$ for a valve $j$ arranged to open inward. Air which forms a convenient elastic cushioning medium is admitted to the cylinders whenever it is desired to transmit motion by means of the apparatus by opening the valves, which are kept closed during the compression strokes of the pistons.

Any suitable link and lever connection, (not shown) may be used for operating the valve $j$, and such connection is separately operated by means of a sleeve in a manner similar to the sleeve shown in Fig. 9 for operating the valve $k$.

It will be seen that if the valves $j$ are held open the pistons $b$ $b^1$ and their cylinders $a$ $a^1$ can reciprocate freely relatively to each other and to the outer casing or guide $h$ and no movement will be imparted to the casing or driven member $h$ of the gear but if the valves $j$ are closed the driven member $h$ will be caused to revolve with the driving members and at the same speed if the total pressure of the air in the cylinders is sufficient to prevent reciprocation of the pistons. If however, the load is such that this pressure is not sufficient to prevent the reciprocating motion of the pistons $b$ $b^1$ in their cylinders $a$ $a^1$ the pistons will exert a driving force up to the end of their compression strokes while on the return stroke during which the air compressed in the cylinders expands again, the pistons will move in the cylinders with no driving force, and the speed of the driven part can diminish in relation to the drive. On the next compression stroke the driven part will be acted upon by the power accumulated in the driving when running free on the expansion stroke giving increased torque to the driven part.

Or alternatively, as shown in Fig. 9, the outer casing $h$ could be arranged to act as an auxiliary cylinder and provided with transfer port $i$ $i^1$ $i^2$ coöperating with ports $j^2$ in the other cylinders in which the pistons work, so that the air released from one cylinder could be admitted to another cylinder and expand in same on the return stroke of its piston so that the work used in compressing the air would not be lost.

In this case the pistons and inner cylinders act as valves covering the ports during the compression stroke and uncovering the same to transfer the compressed air from one cylinder to another at or near the end of the compression stroke.

In the position shown in Fig. 9 the cylinder $a$ and piston $b$ have reached the end of one compression stroke in which position the port $j^2$ comes opposite the port $i$ allowing the compressed air in cylinder $a$ to escape into casing $h$ which acts as an auxiliary cylinder, cylinder $a$ working as a piston in casing $h$. On the return stroke the cylinder $a$ first closes the port $i$ and then compresses the air in casing $h$ until port $j^2$ comes opposite port $i^1$ when the air compressed in casing $h$ is transferred through port $i^2$, port $j^1$ and port $j^2$ to the interior of the cylinder $a$ to resist the next compression stroke of piston $b$.

A rotary air release valve $k$ is seated in the casing $h$ and has a port $k^1$. By suitably actuating this valve by a collar $o$ on the driving shaft $c$ the cylinder $a$ and casing $h$ can be put in communication through ports $m$ $n$ and the valve port $k^1$ to free the clutch.

As shown in Fig. 9 the casing $h$ is formed with radiating ribs or gills for carrying off heat.

What is claimed and desired to be secured by Letters Patent is:—

1. A clutch comprising a driving shaft having cranks formed thereon at an angle of 180°, opposed radial cylinders mounted to revolve freely on the driving shaft and containing an elastic cushioning medium such as air, a piston working in each cylinder and fixed to the opposed cylinder, rods connecting the pistons with the cranks of the driving shaft, and a driven member consisting of a casing or guide surrounding the cylinders and connected with the driven shaft, the whole constructed and operating substantially as described.

2. A clutch comprising a driving shaft having cranks formed thereon at an angle of 180°, opposed radial cylinders mounted to revolve freely on the driving shaft and containing an elastic cushioning medium such as air, a piston working in each cylinder and fixed to the opposed cylinder, rods connecting the pistons with the cranks of the driving shaft, a driven member consisting of a casing or guide surrounding the cylinders and connected with the driven shaft, and air inlet and outlet valves controlling the passage of fluid into and out of said cylinders.

3. A clutch comprising in combination a driving shaft having cranks formed thereon at an angle of 180°, opposed radial cylinders mounted to revolve freely on the driving shaft and containing an elastic cushioning medium such as air, a piston working in each cylinder and fixed to the opposed cylinder, rods connecting the pistons with the cranks of the driving shaft, and a driven member consisting of a casing or guide surrounding the cylinders and connected with the driven shaft, said outer casing acting as a cylinder and being provided with valves for ports coöperating with ports in the other cylinders.

4. The combination with a shaft having cranks thereon at an angle of 180° of pistons connected to said cranks, and cylinders in which said pistons reciprocate, said cylinders being connected to the opposed pistons and being mounted to both rotate and reciprocate.

MARTHA AMANDA APJOHN,
*Sole Executrix.*

Witnesses:
OSCAR CARLBERG,
JANIE HAMILTON.